United States Patent [19]

Yamada et al.

[11] 3,924,942

[45] Dec. 9, 1975

[54] FILM PROJECTION SYSTEM HAVING ATTACHMENT DEVICE CAPABLE OF SWITCHING DIFFERENT SELECTED MODES OF PROJECTION

[75] Inventors: Tateo Yamada, Tokyo; Masanori Uchidoi, Kawasaki, both of Japan

[73] Assignee: Canon Kabushiki Kaisha, Tokyo, Japan

[22] Filed: May 6, 1974

[21] Appl. No.: 467,484

[30] Foreign Application Priority Data

May 8, 1973 Japan.................................. 48-51469

[52] U.S. Cl. .................... 353/25; 353/26; 353/114; 318/44
[51] Int. Cl.² ......................................... G03B 23/04
[58] Field of Search........ 353/25, 26, 107, 103–118; 318/44, 43, 20

[56] References Cited
UNITED STATES PATENTS

| | | | |
|---|---|---|---|
| 2,934,654 | 4/1960 | Pakan.................................. | 250/233 |
| 3,296,727 | 1/1967 | Liguori.................................. | 353/25 |
| 3,499,708 | 3/1970 | Hall.................................. | 353/107 |
| 3,644,027 | 2/1972 | Bennett.................................. | 353/25 |

Primary Examiner—Richard E. Aegerter
Assistant Examiner—Larry Jones
Attorney, Agent, or Firm—Fitzpatrick, Cella, Harper & Scinto

[57] ABSTRACT

A film projection system capable of selectively switching different modes of projection is proposed. This system comprises a film projector proper which is capable of projecting a film frame by frame in an ordinary way and an attachment device which can be fitted to or detached from said projector proper as desired. Said attachment device has means for operating random selection for random access projection, a control circuit designed to compare the selection signal and the detection signal of the address of the film which has reached the projectable position and control film feed so that the difference between said both signals will become substantially zero, and a driving unit actuated by the output from said control circuit to control driving for random access, whereby switchover from and to the normal projection mode and the random access projection mode can be effected with ease with fitting and detachment of said attachment device.

26 Claims, 12 Drawing Figures

FILM PROJECTION SYSTEM HAVING ATTACHMENT DEVICE CAPABLE OF SWITCHING DIFFERENT SELECTED MODES OF PROJECTION

BACKGROUND OF THE INVENTION

1. Field of the Invention

This invention relates to a film projection system having an attachment device capable of effecting selective switching of different projection modes.

2. Description of the Prior Art

In an apparatus whereby a plurality of films or slides can be projected intermittently, such as a slide projector, great convenience will be had if it is possible to optionally select the following different modes of projection: to project the films or slides successively in regular order; to project any desired film selected from the stock of a great many of films; and to repetitively project any desired number of films selected from the stock of films.

A mechanism capable of performing so-called random access projection in a slide projector is known from U.K. Patent No. 1,202,610. This slide projector system comprises, in integral combination, a rotatable slide tray and a control circuit with a manually operable selection means for random selection. However, in the conventional device of this type, the random selection as well as the random access mechanism and projection mechanism therefor would be complicated and also such mechanisms are unnecessary when performing ordinary successive frame-by-frame projection of slide films, and hence these mechanisms could even prove to be detrimental to effective utilization of the apparatus.

SUMMARY OF THE INVENTION

An object of the present invention is to provide a film projection system which is free of the above-said defects of the prior art devices and whereby the mechanism of the film projector proper can be greatly simplified and also various high-degree film projecting modes can be optionally selected as occasion demands.

Another object of the present invention is to provide a film projection system which has an attachment device which can be removably incorporated in the film projector proper for enabling selection of a high-degree film projecting modes such as random access projection and whereby it is possible to exercise high-degree projection techniques to produce specific projection effects while allowing practice of ordinary simple film projection.

It is still another object of the present invention to provide a slide film projection system with high versatility in use in which operating means for random selection of slide films is provided in an attachment unit so that random access projection can be practiced only when said attachment unit is fitted in position in the slide projector, and when it is desired to perform ordinary successive frame-by-frame projection of slide films, said attachment unit is removed to form a simple slide projector.

The other objects and advantages of the present invention will become apparent as this invention is more fully described hereinafter while having reference to the accompanying drawings.

DESCRIPTION OF THE PREFERRED EMBODIMENTS

The embodiments shown in the accompanying drawings are a slide film projector in which feed of the tray containing the slide films and exchange of said slide films are practiced under control by a common power source. These embodiments are described in detail in the following discussion of the invention.

Figure 1:
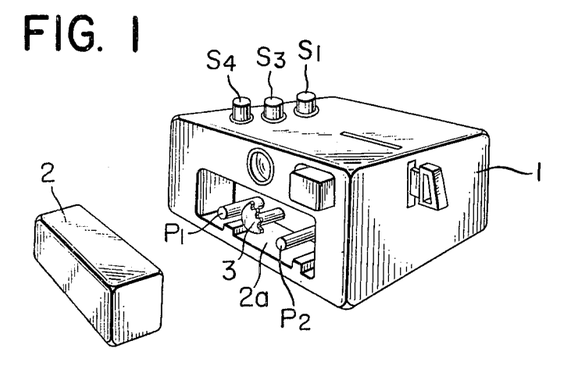
FIG. 1 is an external perspective view of the body portion of a projector apparatus adapted in a film projection system according to the present invention, said projector apparatus being shown in a state of use with no attachment device fitted thereto.
Figure 2:
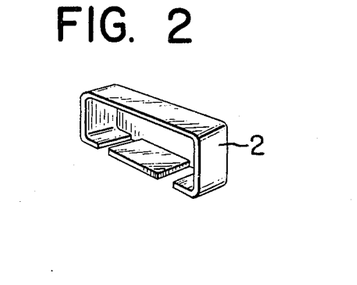
FIG. 2 is an external perspective view of a cover member which is placed in the attachment device joining portion of the projector body shown in FIG. 1 when said attachment device is not joined.
Figure 3:
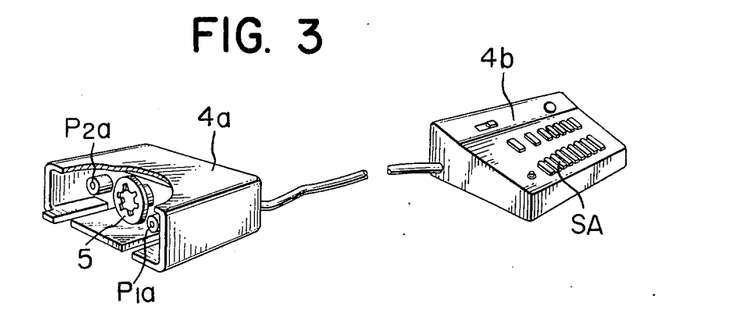
FIG. 3 is an external perspective view of an attachment device which can be detachably joined to the body portion of the projector apparatus shown in FIG. 1.

FIG. 1 is a perspective view showing the external appearance of the body portion of a projecting apparatus according to the present invention. When the apparatus is used for performing normal projection, a cover 2 is fitted to a portion 2a of said body portion of the apparatus 1 where an attachment device, to be described later, is otherwise joined. A view of said cover 2 as taken from a different angle is shown in FIG. 2. With said cover 2 fitted to the film projector 1, it is possible to move the slide film containing tray either forwardly or rearwardly in a frame-by-frame manner. For performing a high-degree film projecting mode other than normal film projection, such as for example random access projection, a signal corresponding to the forward or backward motion for one frame of the tray in the film projecting apparatus must be supplied to the tray driving means in said apparatus. FIG. 3 shows an attachment device which can be mounted to or removed from the body portion of the projecting apparatus as desired. This attachment device comprises a driving unit 4a including an external gear 5 engageable with a connecting gear 3 provided in the joining portion 2a of the projector body 1. Said driving unit 4a is electrically connected to a control board 4b provided with a plurality of random access selection switches SA and other operating switches ($S_7$ – $S_9$) to be described later).

Figure 4:
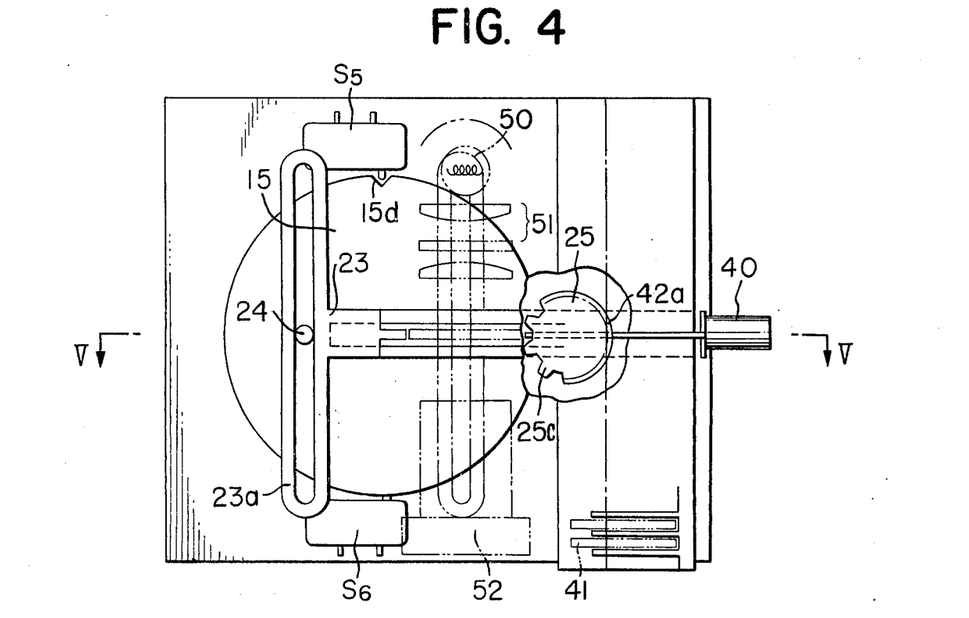
FIG. 4 is a front view of the projector proper shown in FIG. 1, with the upper housing being removed to bare the internal mechanism.

Now, the arrangement and operation of the present projector apparatus are described with particular reference to FIGS. 4 to 10. In FIG. 4 is shown a plan view of the apparatus where a light source 50, an optical condensing system 51 and an optical projection system 52 are shown in their respective positions by double-dotted chain lines. Numeral 40 indicates a manually operated means for exchange of slide films, and numeral 42 refers to a tray containing a plurality of slide films 41 therein, said tray being arranged movable either forwardly or rearwardly (in the vertical direction in FIG. 4).

Figure 5:
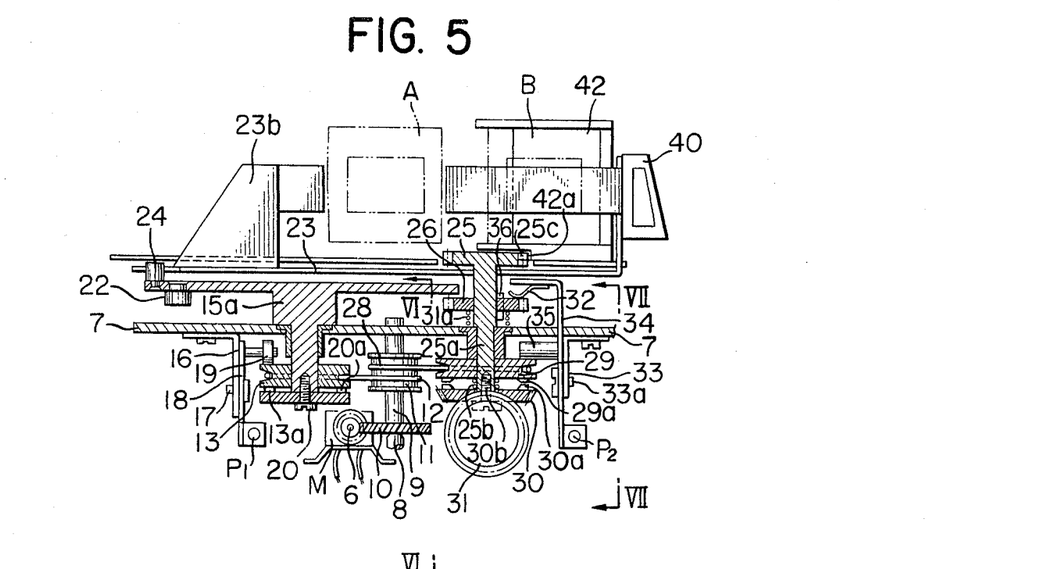
FIG. 5 is a sectional view taken along the line V—V and in the direction of arrows in FIG. 4.
Figure 6:
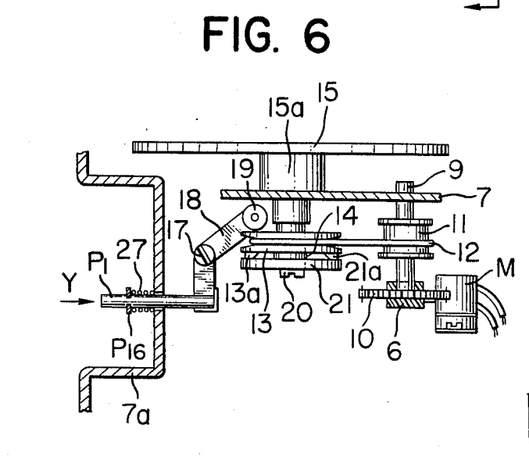
FIG. 6 is a sectional view taken along the line VI—VI and in the direction of arrows in FIG. 5.

The slide film projecting position is indicated by A in FIG. 5 and the slide feeding position by B. As seen in FIGS. 5 and 6, motor M has secured to its output shaft a worm gear 6 which is meshed with a gear 10 fixed to a revolving shaft 9 supported by an earth plate 7 by a pivot 8. Secured to said revolving shaft 9 is a pulley 11 which is operatively connected to a clutch pulley 13 through a belt 12. Said pulley 13 has a clutch teeth 13a engageable with the corresponding toothed portion of a shaft 15a which is fixed by a screw 20 in opposed relation to said pulley. At the other end of said shaft 15a is integrally secured a disc-like cam plate 15 such as shown in FIGS. 4 and 5. A pin 24 is planted on the upper face of said cam plate and a pin 22 on the underside thereof. Said pin 24 fits in a slot 23a formed in the T-shaped portion of a slide film feed lever 23 as shown in FIG. 4. The lever 23 can be moved in the right and left direction in FIG. 4 through said pin 24 with turning of said cam plate 15, thereby moving each slide film from its position in the tray to the projecting position, or contrariwise, while supporting said film with a support frame 23b. As shown in FIG. 6, a roller 19 engageable with said pulley 13 elastically presses the top surface of said pulley in the direction where the clutch teeth 13a are urged to mesh with the corresponding toothed portion of the shaft 15a. Said roller 19 is mounted at an end of a lever 18 swingable about a pivot 17, with the other end of said lever being secured to a pin $P_1$ which projects into the joining portion 2a of the projector body 1 shown in FIG. 1 and is pressed to the left (in FIG. 6) by a spring 27 disposed between a partition wall 7a and a stopper $P_{1b}$ so as to maintain coupling between said pulley 13 and shaft 15a.

Figure 7:
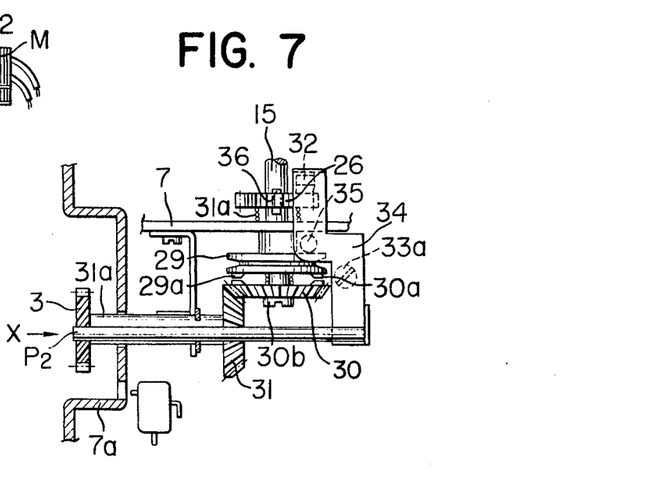
FIG. 7 is a sectional view taken along the line VII—VII and in the direction of arrows in FIG. 5.

Around said pulley 11 is passed a second belt 28 whereby said pulley 11 is operatively connected to another pulley 29 (see FIG. 5). Said pulley 29 is formed with a clutching portion 29a engageable with corresponding clutching portion 30a provided on a helical gear 30. Between said both clutching portions is interposed a spring 25b which acts in the declutching direction. Said helical gear 30 is integrally joined to a rotary shaft 25a by a screw 30b. Therefore, said clutch pulley 29 is loosely fitted to said shaft 25a. A pinion 26 is mounted on said rotary shaft 25a by a key 36 so that said pinion is movable only in the direction of thrust, and a spring 31a is disposed between said pinion 26 and earth plate 7. Provided integrally with the end of said shaft 25a is a pinion 25 adapted for feeding of the slide containing tray. The teeth 25c of said pinion (see FIG. 4) are engaged with the corresponding teeth 42a provided at the lower part of the tray, allowing said tray to move forwardly or rearwardly one pitch at one time. The end of a pin $P_2$ projecting into said joining portion 2a of the projector body 1 is, as shown in FIG. 7, joined to a lever 34 swingable about a shaft 33a secured to a supporting member 33 fixed to the earth plate 7. A pin 35 is planted on said lever 34 (see FIG. 5), said pin 35 being engageable with the top surface of the pulley 29, and when engaged, it acts to couple said pulley 29 to the helical gear 30 through clutch engagement. Also provided at an end of said lever 34 is a stopper 32 which elastically contacts the upper face of the pinion 26, whereby when said pin $P_2$ is forced to the right in FIG. 7, that is, in the direction of arrow X, said pinion 26 is moved out of the locus of engagement between the cam plate 15 and pin 22 by the action of said stopper 32.

Said helical gear 30 is meshed with another helical gear 31 provided on a shaft 31a extending perpendicular to said gear 30, and the internal gear 3 for operative connection shown in FIG. 1 is secured to the other end of said gear shaft 31a (see FIG. 7).

Figure 8:
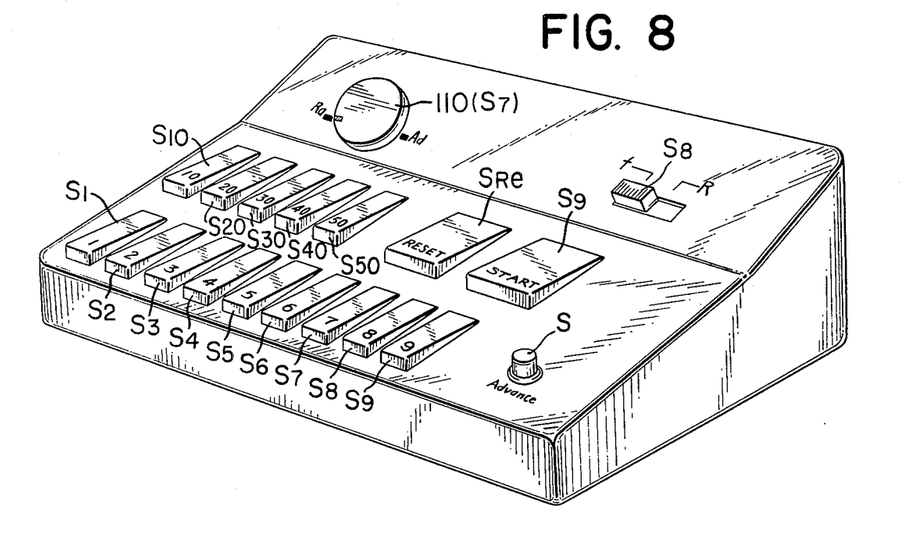
FIG. 8 is an enlarged perspective view showing the details of the operating board for the attachment device shown in FIG. 3.

Referring now to FIG. 8, there is shown in detail the control unit 4b shown in FIG. 3. It is provided with selection switches corresponding in number to the slide, films which are for instance composed of 50 frames in all, and these switches are arranged in two groups: the group of switches of the first order ($S_1$ – $S_9$) and the group of switches of the second order ($S_{10}$ – $S_{50}$). There are also provided, besides them a start switch $S_9$, a resetting switch $S_{Re}$, a knob 110 for selecting either of the two projecting modes: random access projection or normal orderly frame-by-frame projection, a switch $S_8$ for switching the direction of feed of the slide film containing tray, from forward to rearward or from rearward to forward direction and a manual advance operating switch S.

Figures 9, 10:
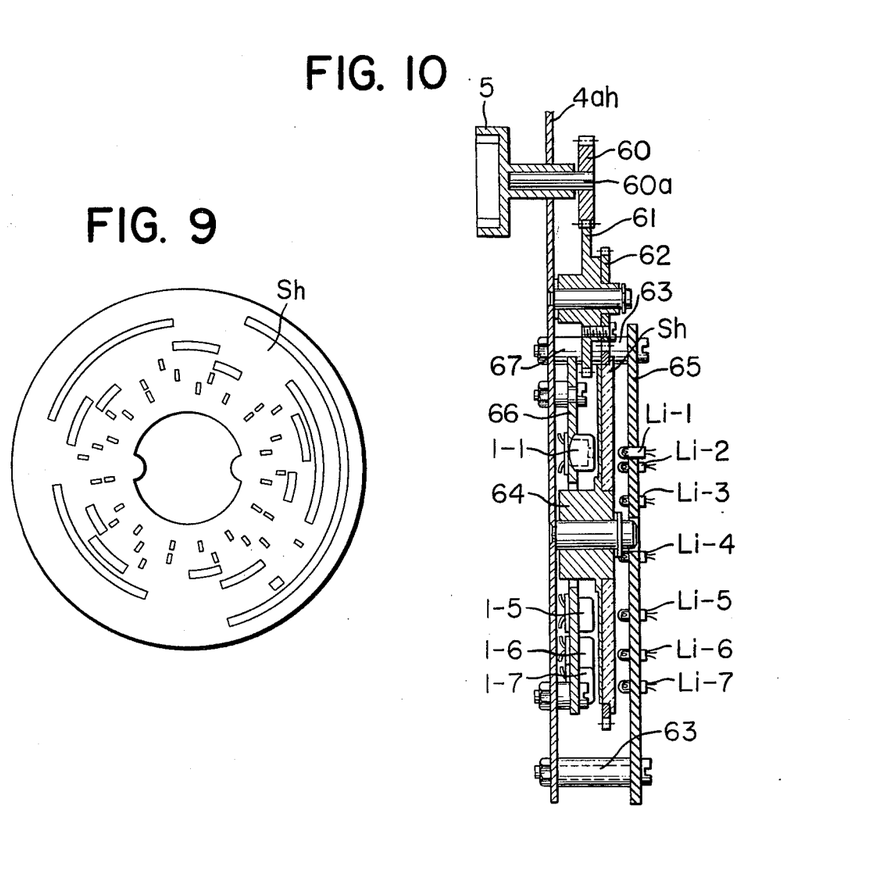
FIG. 9 is a plan view of a light shielding plate having light-transmitting parts and light-non-transmitting parts arranged in a set pattern for detecting address signal from each slide film.
FIG. 10 is a sectional view of an address detector unit having means for rotatably supporting the light-shielding plate shown in FIG. 9 and means for supporting the light source.

This slide housing chamber of said tray is provided in operative relation with the reference addresses of the slide films. A detection plate $Sh$ having a regulated pattern of light-transmitting portions and light-non-transmitting portions as shown in FIG. 9 is provided as the slide film reference address detecting means, whereby it is possible to identify the slide film which has just arrived at the film-projecting position. The arrangement of this detection plate and its associated elements in shown in detail in FIG. 10. It will be seen that there is provided a gear 60 rotatable integrally with a shaft 60a engaged with the drive gear 5 in the operating unit 4a of the attachment device shown in FIG. 3, said gear 60 being meshed with the teeth at the lower peripheral end of said detection plate $Sh$ through an intermediate gear 61 and a gear 62 arranged to be rotatable therewith. Thus, when driven by connection of the gear 5, said detection plate $Sh$ is rotated while supported by the shaft 64. On one side of said detection plate $Sh$ are provided light sources Li-1 Li-7 arranged on a support plate 65, said light sources being same in number as the reference addresses. On the opposite side of said detection plate and in position to said respective light sources are provided light-receiving elements 1—1 - 1-7 supported by a support plate 66. Said both support plates are secured to a housing 4ah by means of fixed pins 63, 67.

Before describing the electric circuit including the microswitches $S_5$ and $S_6$ for detecting the position of the cam plate shown in FIG. 4, discussion is first made on the operation of the above-described arrangement of the apparatus.

First of all, the operation of the projecting apparatus using no external attachment device is described. Since the attachment device shown in FIG. 3 is not used, the pins $P_1$ and $P_2$ protruding into the joining portion shown in FIG. 1 are in the non-operative position, and hence the pulley 13 is elastically pressed by the roller 19 (see FIG. 6) into operatively coupled relation with the revolving shaft 15a of the cam plate 15 through clutches. As driving force of motor M is transmitted to said pulley 13 through gears 6, 10, pulley 11 and belt 12, the cam plate 15 is rotated by said pulley 13 at a predetermined speed. This movement is further transmitted through the pin 24 to the slide feed lever 23 to let it move in the lateral direction in FIG. 4, causing the slide films 41 to move out one by one from the tray 42 to the projecting position of from said projecting position back into the slide film housing position in the tray. Every such stroke is accomplished with one rotation of the cam plate 15. Stopping of turning motion of said cam plate at every half rotation, that is, at the slide film projecting position and at the housed position in the tray is effected by detecting a recess 15d provided at a part of the circumference of said cam plate 15 by the switches $S_5$ and $S_6$.

Forward or rearward motion of said tray 42 pitch by pitch corresponding to one motion of the slide can be accomplished in the following way. Since the pin $P_2$ in the joining portion is in the inoperative condition the pulley 29 and helical gear 30 are disconnected from each other, and hence rotative force of motor M is not transmitted to the shaft 25a. The pinion 26 is also retained at a position where it is engageable with the pin 22. As the cam plate rotates in the manner described above, said pin 22 is engaged with the toothed portion of the pinion 26 upon one rotation of said cam plate, allowing one-pitch turn of said pinion and corresponding one-pitch turn of the tray feeding pinion 25, whereby the tray 42 engaged with said pinion 25 is urged to make one-pitch forward motion. In this way, normal orderly slide feed and rectilinear motion are accomplished.

We will now describe the operation for accomplishing a different slide film projecting mode by fixing the attachment device of FIG. 3 in the joining portion of the projector apparatus. A pair of driving members $P_{1a}$ and $P_{2a}$ are provided in the operating unit 4a of said attachment device. These driving members can be placed in opposition to or displaceably fitted with said pins $P_1$ and $P_2$, respectively, by suitable pressing means such as a plunger. So, before describing the operation of the control unit 4b of the device in detail, we will first describe the operation of the projector proper which is in a situation where said pins $P_1$ and $P_2$ were displaced by said respective driving members $P_{1a}$ and $P_{2a}$.

When the pin P1 is in the state of being forced out in the direction of arrow Y in FIG. 6, elastic pressure of the roller 19 against the pulley 13 is released through the lever 18, breaking off the engagement between said pulley 13 and the cam plate rotating shaft 15a, and hence the driving force from the motor M is not transmitted to said rotating shaft. On the other hand, when the pin $P_2$ is in the state of being forced in the direction of arrow X in FIG. 7, the lever 34 stays in a state of having turned counterclockwise in the same figure, so that the pulley 29 is urged by the pin 35 to operatively join with the helical gear 30 through clutches. At this time, the pinion 26 is also held by the stopper 32 in its lowered position (see FIG. 5) outside the locus of engagement with the pin 22 against the force of spring 31a. Therefore, the driving force of motor M is conveyed through gears 6, 10, pulley 11 and belt 28 to the pulley 29 and further to the helical gear through clutch means to rotate the shaft 25a. This rotation of the shaft 25a allows the tray 42 having a rack 42a meshed with the pinion 25 to make advancing motion through a distance of desired number of pitches. Since the amount of this movement of the tray is transmitted in the form of rotating motion of the internal gear 3 through gear 31 and shaft 31a, the external gear 5 of the attachment device, which is meshed with said gear 3, is urged to turn correspondingly to said movement of the tray, and the amount of turning motion of said external gear 5 is detected by a photoelectric detecting means shown in FIG. 10 and is guided to the control unit 4b to indicate the actual location of the tray.

For effectuating a high-degree projecting mode such as random access projection, said pin $P_1$ is kept in its inoperative position and the cam plate 15 is turned to return the slide film from its projecting position into the tray and then the pins $P_1$ and $P_2$ are displaced through the control unit so that, with the cam plate 15 being kept stationary, the slide containing tray 42 alone is moved advancing rectilinearly until a desired slide film reaches its projecting position, and thereafter, hold on the pin $P_1$ is released and the cam plate 15 is again turned to actuate a push-up member 23 to transfer the selected slide film to the projecting position. After completion of its projection, said slide film is again stored in the tray.

In the above-described process, in order to select a desired film from the stock of a great many of slide films in the tray, there are required means for impressing the address of the slide to be selected to the control unit, as well as actual tray position detecting means and signal comparing means whereby the actual position of the tray and the position of the selected slide are compared and the tray driving means is operated so that the difference therebetween will become zero, said driving means being stopped when said difference has become zero. In an embodiment of the present invention, such means are incorporated in the attachments 4a and 4b outside the mechanism of the projector proper. The electric circuit arrangements of these means are now described with particular reference to FIGS. 11 and 12.

Figures 11, 11B:
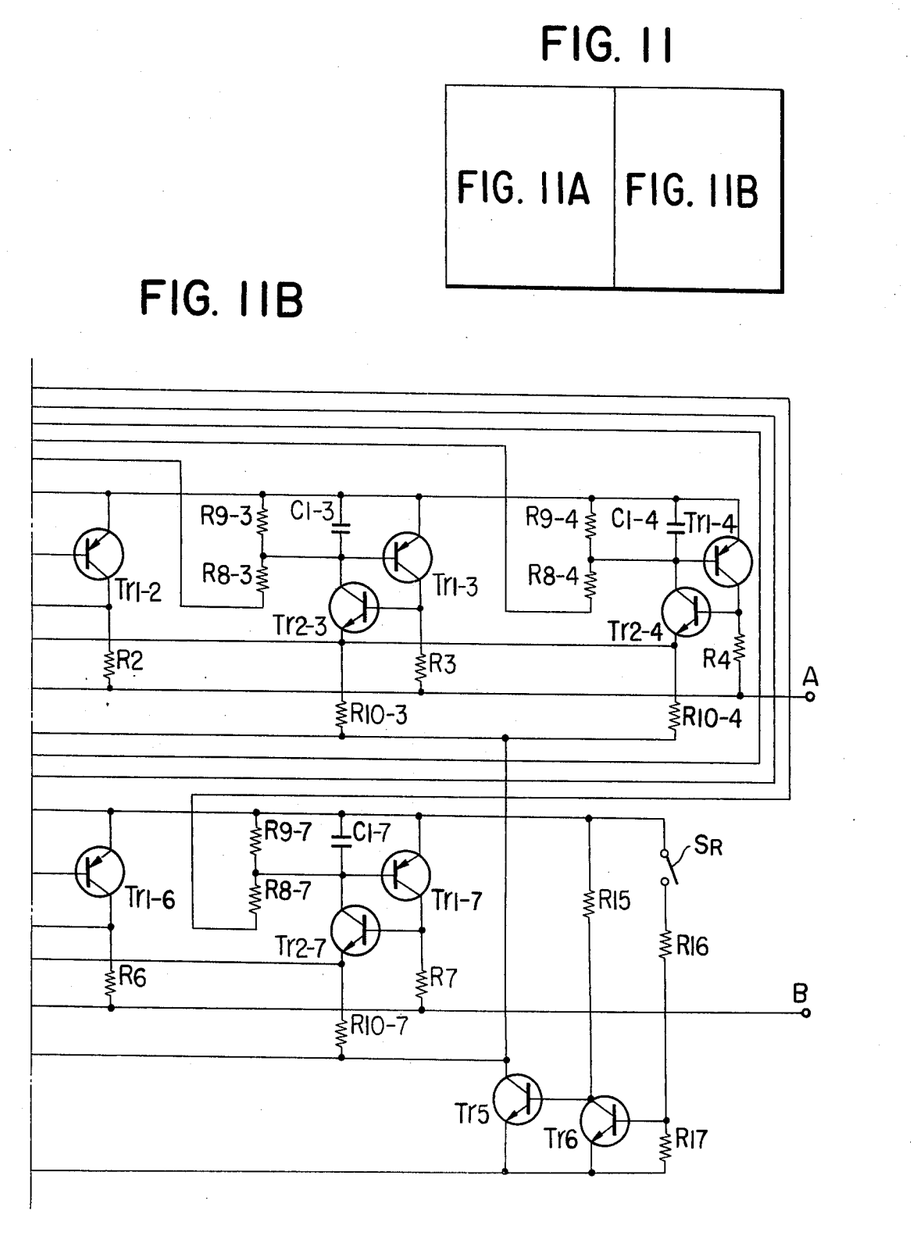
FIG. 11 is a circuit diagram showing an example of electric circuitry for the control unit shown in FIGS. 3 and 8.
Figure 11A:
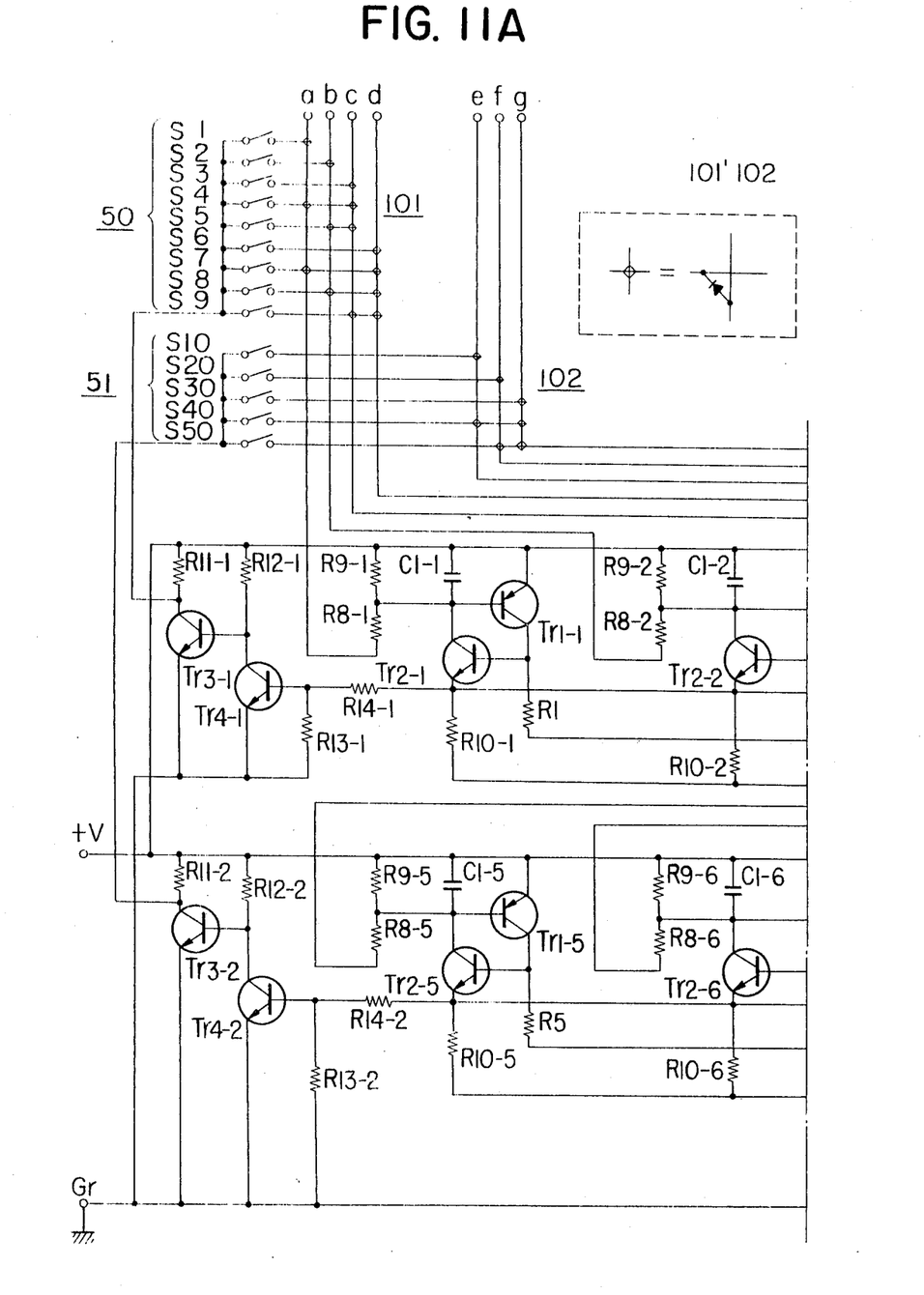

First referring to FIG. 11 the control circuit including the encoders, memories and reset circuit will be described. The slide film address selection switches $S_1$–$S_9$ and $S_{10}$–$S_{50}$ are generally designated by 50 and 51, respectively, The encoders 101 and 102, comprise diode matrixes the detail of which is shown at 101' and 102'.

$S_r$ is a reset switch connected to the reset button $S_{re}$(- see FIG. 8). $Ri$ and $Ci$ are resistors and capacitors (where $i = 1, 2, 3, \ldots i$); and $Tr1$-$i$ and $Tr2$-$i$ and pnp and npn transistors (where $i = 1 - 7$). In general the base of the transistor $Tr1$-$i$ is connected to the collector of the transistor $Tr2$-$i$, and the collector of the transistor $Tr1$-$i$ is connected to the base of the transistor $Tr2$-$i$. The emitter of the transistor $Tr1$-$i$ is connected to a +V terminal. The collector of the transistor $Tr1$-$i$ (where $i = 1 - 4$) is connected to a terminal A through a resistor $Ri$, and the collector of the transistor $Tr1$-$i$ (where $i = 5 - 7$) is connected to a terminal B through a resistor R$i$. The base of the transistor T$r$1-$i$ is connected to the terminal +V through the capacitor C1-$i$ and the resistor R9-$i$ (where $i = 1 - 7$) and to the encoders 101 and 102 through the resistor R8-$i$.

The emitter of the transistor T$r$2-$i$ (where $i = 1 - 4$) is connected to a common line through a resistor R10-$i$ (where $i = 1 - 4$), and the emitter of the transistor T$r$2-$i$ (where $i = 5 - 7$) is connected to a common line through a resistor R10-$i$ (where $i = 5 - 7$) and to the collector of an NPN transistor T$r$5 whose base is connected to the collector of an NPN transistor T$r$6. The collector of the NPN transistor T$r$6 is connected to the terminal +V through a resistor R15. The emitters of the transistors T$r$5 and T$r$6 are connected to a terminal G$r$ which is grounded. The base of the $t$ transistor T$r$6 is connected to the terminal G$r$ and to the switch S$_r$ through a resistor R16. The emitters of the transistors T$r$2-$i$ ($i = 1 - 4$) are connected through a resistor R14-1 to the base of an NPN transistor T$r$4-1 and to the terminal G$r$ through a resistor R13-1. The collector of the transistor T$r$4-1 is connected to the terminal +V through a resistor R12-1 and to the base of a transistor T$r$3-1, whose collector is connected to the terminal +V through a resistor R11-1 and to common terminals of the switches 50 and 51. The emitters of the transistors T$r$2-$i$ ($i = 5 - 7$) are connected through a resistor R14-2 to the base of an NPN transistor T$r$4-2 and also to the terminal G$r$ through a resistor R13-2. The collector of the transistor T$r$4-2 is connected to the base of a transistor T$r$3-2 and to the terminal +V through a resistor R12-2. The collector of the transistor T$r$3-2 is connected through a resistor R11-2 to the terminal +V and to the common terminals of the switches 50 and 51.

Next the mode of operation will be described. The address of a selected film slide is entered by pushing the switches in the switch groups 50 and 51 and is converted into the coded signals by the encoders 101 and 102. Then for example the base potential of the transistor T$r$1-1 of the memory circuit comprising the transistors from T$r$1-1 to T$r$1-7 is dropped so that the transistor T$r$1-1 is turned on and the collector potential, that is the voltage at the base of the transistor T$r$2-1 is raised. Therefore the transistor T$r$2-1 is turned on so that the collector potential thereof, that is the base potential of the transistor T$r$1-1, is dropped. Under these conditions even when the switches in the switch group 50 are opened, both the transistors T$r$1-1 and T$r$2-1 remain on. Instead of the above transistor memory, any suitable memory comprising SCRs (silicon-controlled rectifiers), flip-flops or relays capable of remaining in one state until the signal is applied so that they are driven into the other state may be employed.

When the transistor T$r$1-1 is turned on some or all ends of the resistors R1-R7 are connected to the terminal +V so that the current flows to the common terminal A or B of the registors R1-R7. The common terminals A and B are connected to the corresponding terminals A and B in the next stage shown in FIG. 12.

When the transistor T$r$1-1 is turned on the emitter potential of the transistor T$r$2-1 rises so that the base potential of the transistor T$r$4-1 or T$r$4-2 also rises. As a result the transistor T$r$4-1 or T$r$4-2 is turned on whereas the transistor T$r$3-1 or T$r$3-2 is turned off so that the common terminal of the switch bank 50 or 51 is disconnected from the terminal G$r$. Therefore, even when the switch in the switch bank 50 or 51 is depressed, the base potential of the transistor T$r$1-1 remains unchanged. Thus, it is seen that the transistors T$r$3-1 and T$r$4-1 and T$r$3-2 and T$r$4-2 make up the protective circuits.

Normally the transistor T$r$6 is off whereas the transistor T$r$5 is on. Upon depression of the reset switch, the positive pulse is applied to the base of the transistor T$r$6 so that the latter remains on during a predetermined term whereas the transistor T$r$5 stays off. Thus the transistors T$r$1-1 and T$r$2-1 are turned off. That is, the signals stored in the memory circuits are erased.

Figures 12, 12B:
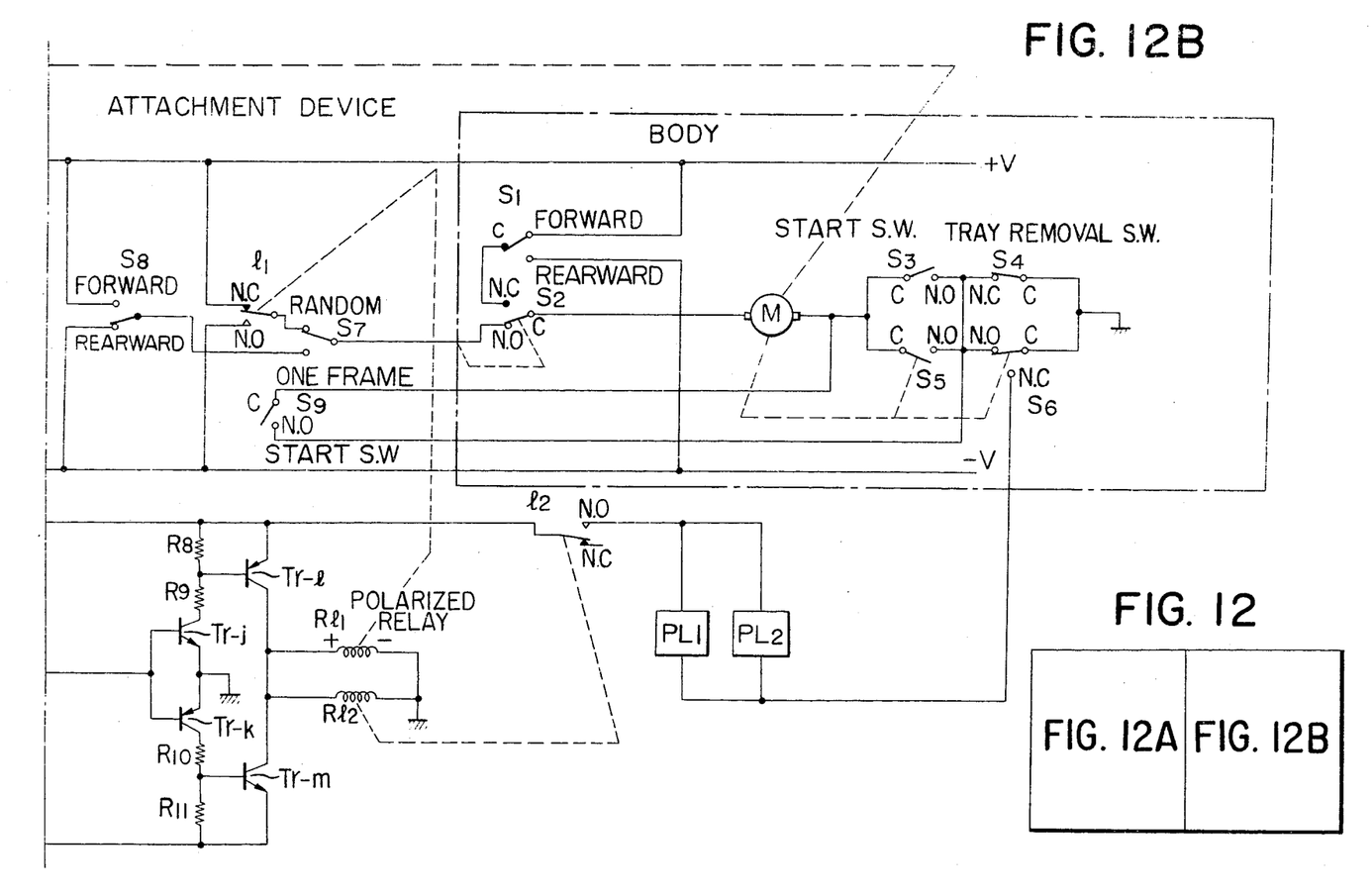
FIG. 12 is a circuit diagram showing an example of electric circuitry for electrically processing the signal from the address detector unit shown in FIG. 10 and the signal from the control unit shown in FIG. 11 and controlling the film projection.
Figure 12A:
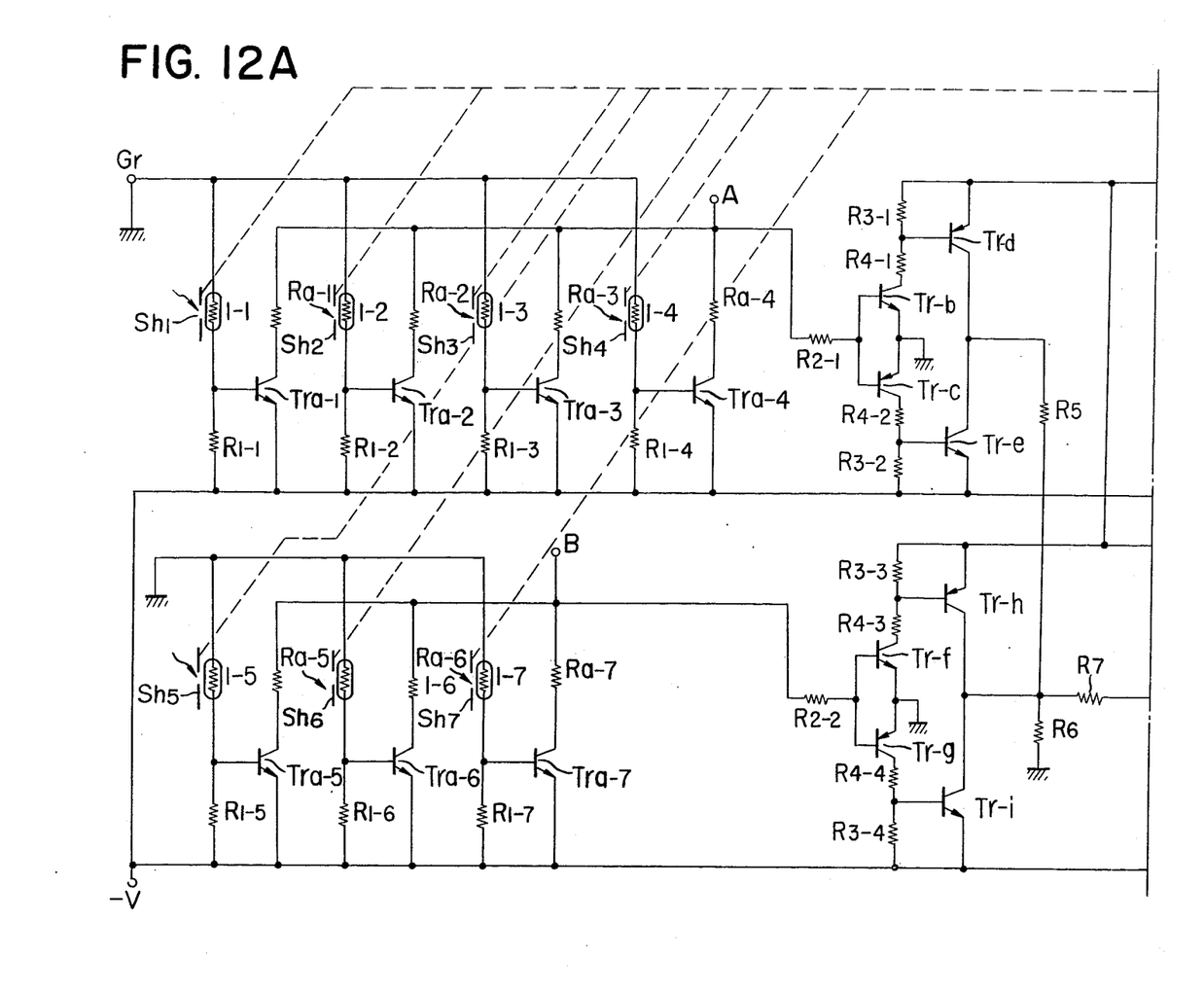

In FIG. 12, the part sectioned by the dotted chain lines shows the arrangement in the projector proper and the other part shows the arrangement in the attachment device. In the figure, 1-1 to 1-7 designate the above-said photoelectric elements. T$ra$-1, T$ra$-7, T$r$-$b$, T$r$-$e$, T$r$-$f$, T$r$-$i$, T$r$-$j$ and T$r$-$m$ are NPN transistors, T$r$-$c$, T$r$-$d$, T$r$-$g$, T$r$-$h$, T$r$-$k$ and T$r$-$l$ are PNP transistors, R1-1 to R1-7; R$a$-1 to R$a$-7; R2-1, and R2-2; R3-1 to R3-4; R4-1 to R4-4; and R5 to R11 are resistors, R$l$1 is a polarized relay which is energized when a current flows in the direction of the electrode, R$l$2 is a relay $l$1 is a contact of said polarized relay R$l$1, $l$2 is a contact of said relay R$l$2, and M is a DC motor mounted in the body portion of said projector apparatus. S1 is a switch provided in the body portion of the apparatus for effecting switching from and to forward motion and rearward motion of said tray, S2 is a switch which is connected to the normally open contact (hereinafter referred to as NO contact) when said attachment device is joined to the body portion of the apparatus, S3 is a start switch in the body portion of the apparatus, S4 is a tray removal switch, S5 is a switch which is turned off when a slide film is set in the projected position, S6 is a swich which is connected to the normally closed contact (hereinafter referred to as NC contact) when the slide film is received in the tray, S7 is a changeover switch for switching frame-by-frame feed of the slide film to random access or vice versa, S8 is a switch for effecting changeover from and to forward motion and rearward motion of the attachment device, and S9 is a start switch for the attachment device. PL1 and PL2 are plungers for driving the members P1$a$ and P2$a$ for displacing said pins P1 and P2, respectively. When both of said plungers PL1 and PL2 stay off, slide projection is performed with normal frame-by-frame forward or rearward motion of the slide film as aforesaid.

The arrangement and operation for practicing random access projection are now described. In the selection section SA of the attachment device (see FIGS. 3 and 8) is provided a keyboard on which the numerical figures of the first order and those of the second order are arranged in two rows. It is possible to select any desired slide film from the stock of a great many of slide films through suitable combination of the keys in the two groups. The signal selected by said keyboard is applied to the input terminal A when such selected signal is of the first order number and to the input terminal B when said signal is of the second order number as described before in relation with FIG. 11. At said both input terminals A and B, the signal of the slide film present at the projection position is detected by the photoelectric elements 1—1 - 1-7 and the shutters S$h$1 - S$h$7 arranged so as to be capable of shielding the light from light sources Li-1 - Li-7 in front of said photoelectric elements 1—1 - 1-7 (see FIG. 10), and the added signals from said input terminals A and B are passed through resistors R2-1 and R2-2 and impressed to the bases of transistors T$r$-$b$, T$r$-$c$ and T$r$-$f$. The signal corresponding to the actual position of the tray is obtained as the light from the light source is intercepted by opening and closing of the shutters in front of photoelectric elements in accordance with movement of said tray. In other words, when light enters in the light receiving faces of the photoelectric elements, the impedance of said elements drops while the base potential of the NPN transistors T$ra$-$n$ (where $n = 1,2 \ldots$) rises up to turn said transistors on, whereby the resistors R$a$-$n$ are connected to the −V terminal of the power source. Said resistors R$a$-$n$ are set to correspond respectively to certain numeral figures according to the weighting resistances. For instance, resistivities of these resistors are set at the following relations: R$a$-1: R$a$-2: R$a$-3: R$a$-4 $= 8 : 4 : 2 : 1$; and R$a$-5 : R$a$-6 : R$a$-7 $= 4 : 2 : 1$. Thus, with keying-in on the keyboard, the signal of the selected number and the signal corresponding to the actual position of the tray are applied to the input terminals A and B, respectively, to impress the electric signals (potentials) proportional to the figures of the first order and the second order, respectively. When the signal of the selected number is greater than the position signal of the tray, a positive potential appears at both terminals A and B, and when contrariwise, a negative potential appears at said both terminals. Here, when a positive potential develops, transistors T$r$-$b$ and T$r$-$d$ in the signal system of the first order are turned on to connect the collector of said transistor T$r$-$d$ to the +V terminal of the power source, while in the signal system of the second order, transistors T$r$-$f$ and T$r$-$h$ are turned on to connect the collector of transistor T$r$-$h$ to the +V terminal of the power source.

On the other hand, when the potential is negative, transistors T$r$-$c$, T$r$-$e$, T$r$-$g$ and T$r$-$i$ are turned on and the collectors of transistors T$r$-$e$ and T$r$-$i$ are connected to the −V terminal of the power source. If the signs of the first and second orders are different from each other, the first order side is connected to the resistor R7 through resistor R5 whilst the second order side is connected directly to resistor R7, so that a potential having the signal sign of the second order presents itself in transistor R7. If the signal sign is positive at this time, transistors T$r$-$i$ and T$r$-$e$ are turned on and a current flows to relays R11 and R12 through emitter and collector of transistor T$r$-$e$. As the current flows in the direction of polarity of the polarized relay R$l$1, said relay R$l$1 is energized as so is the relay R$l$2.

On the other hand, switch S5 stays on since the slide film is at the projected position. If the start switch S9 (on the attachment device) or switch S3 (on the projector body) is pushed, a current flows from the −V terminal of the power source through the course of: NO contact of relay switch $l$1 of relay R 1 - common (C) contact - random access side of switch S7 - C contact - NO contact of switch S2 - C contact and further through motor M - switch S3 or S9 - switch 4 to the earth, so that motor M is rotated. At this stage, plungers PL1 and PL2 remain inoperative since switch S6 still stays on the NO side.

Then, when the slide film is housed in the tray and switch S6 is turned to the NC side, said both plungers PL1 and PL2 are actuated to transmit rotation of motor M in the manner described before in connection to FIGS. 4 to 10 to move the tray correspondingly. As a result, the signal corresponding to the tray position at this moment is fed back to said input terminals A and B. This feed-back may be accomplished either mechanically by utilizing suitable coupling means such as gearing as shown in FIGS. 3 and 7 or by detecting the tray position photoelectrically as shown in FIGS. 9 and 10. The latter method is employed in the electric circuitry shown in FIG. 12. The arrangement shown in FIG. 10 may be modified such that the rotary disc having said shutter S$h$1 − S$h$7 is turned by gear 5 shown in FIG. 3 thereby to open and close the light pass between each light source and the corresponding photoelectric element. In either way, the shutters in front of the photoelectric elements are opened and closed successively in accordance with movement of the tray to detect the tray position, and the detection signal is impressed to the input terminals A and B. The point at which said input signal to said terminals A, B becomes zero is the very position of the selected slide address number, and at this point said transistor circuit is rendered off to ultimately deenergise both said relays R$l$1 and R$l$2. As relay switch 12 is accordingly turned to the NC side, both plungers PL1 and PL2 are rendered off. During this time, even if the relay switch $l$1 is turned to the NC side, current keeps flowing to the motor M just as when the tray is reversed in its motion, so that said motor continues its rotation. As the plungers PL1 and PL2 are turned off, the pins P1 and P2 in said joining portion of the projector body return to their original positions, so that said normal projection mode is restored and rotation of said motor M is transmitted through the cam plate so as to move the slide film from its position in the tray to the projecting position. When the slide film arrives at the projecting position, switch S5 is turned off to stop motor M, whereupon the projecting step is now initiated. Since other steps are same as known in the prior art, they are not discussed here.

When practicing one-frame feed of the slide film during normal slide film projection, a positive or negative voltage is applied to one of the terminals of motor M through switch S1 or S3, and when start switch S3 or S9 is operated to flow a current to said motor M, one-frame forward or rearward motion of the slide film is effected through the tray.

While the present invention has been described by way of an illustrative embodiment thereof, the invention is of course not limited to such particular embodiment. For instance, the rectilinearly moving tray arrangement may be remodeled into a rotary type. Also, in the driving and controlling system, it is possible to employ a slide changeover mechanism which is driven and controlled by a power source separate from that used for tray feed. Further, although there was shown in the foregoing embodiment of the present invention an arrangement in which the projection mode switching means are automatically operated upon joining of the attachment device to the body portion of the projector apparatus, it is also possible to provide the attachment device itself with a manual switchover mechanism.

According to the present invention, as described in detail hereinabove, an attachment device capable of effecting desired selection and changeover of high-degree projection modes such as so-called random access projection is joined, when so desired, to a known type of projector which is capable practicing normal frame-by-frame projection of slide films.

We claim:

1. A film projection system capable of random access projection comprising:
   a film projection apparatus including slide film storage means for storing a plurality of slide films, and drive means for moving said slide film storage means along a predetermined path and for transporting the slide films in said slide film storage means to a slide film projectable position where a selected slide film is set for projection; and an attachment unit attachable to and detachable from said projection apparatus, said attachment unit including random access operating means for controlling said drive means to project a desired one of said plurality of slide films, said random access operating means being located at a position in said attachment unit where at least one part of said operating means becomes mechanically linked with said drive means for controlling operation of said drive means when said attachment unit is attached to said film projection apparatus, said random access operating means comprising signal input entry means for entering a desired projection address signal for the random access, signal processing means for converting the entered projection address signal to corresponding movement of said one part of said operating means, signal holding means for holding the entered projection address signal for a predetermined time, and means for releasing said signal holding means from holding operation of the entered projection address signal;

whereby random access projection can be performed when said attachment unit is coupled to said film projection apparatus.

2. A film projection system according to claim 1 wherein said signal input entry means includes a plurality of switch members each of which generates a component of said address signal according to selective operation thereof.

3. A film projection system according to claim 2 wherein said switch members are connected to produce address signals which are representative of the different addresses of different slide films in said slide film storage means.

4. A film projection system according to claim 2 wherein said signal holding means comprises a plurality of electrical memory means each being coupled to a corresponding one of said plurality of switch members.

5. A film projection system according to claim 4 wherein said releasing means comprises a transistor circuit connected to empty said memory means and a mechanical switch member electrically connected to operate said transistor circuit.

6. A film projection system according to claim 1 wherein said signal processing means includes address detecting means for detecting the address of each slide film when the film locates at a position where projection can be performed.

7. A film projection system according to claim 6 wherein said address detecting means includes a coded reference means mounted to move with said slide film storage means and means for reading information from said coded reference means.

8. A film projection system according to claim 7 wherein said information reading means comprises light source for emitting light beam toward said coded reference means, and photoelectric converting means for converting the light beam through said coded reference means from said light source to corresponding electric signals.

9. A film projection system according to claim 1 wherein said film projection apparatus includes means for selectively switching said slide film storage means to step up and step back by said drive means.

10. A film projection system capable of random access projection comprising:

a film projection apparatus including slide film storage means for storing a plurality of slide films, and drive means for moving said slide film storage means along a predetermined path and for transporting the slide films in said slide film storage means to a slide film projectable position where a selected slide film may be set for projection; and an attachment unit attachable to and detachable from said projection apparatus, said attachment unit including random access operating means for controlling said drive means to project a desired one of said plurality of slide films, said random access operating means being located at a position in said attachment unit where at least one part of said operating means becomes mechanically linked with said drive means for controlling operation of said drive means when said attachment unit is attached to said film projection apparatus, said random access operating means comprising signal input entry means for entering a desired projection address signal for the random access, signal processing means for converting the entered projection address signal to corresponding movement of said one part of said operating means, signal holding means for holding entered projection address signal for a predetermined time, means for releasing said signal holding means from holding operation of the entered projection address signal, and, address detecting means for detecting an address of slide film, which film locates at the position where the projection can be performed, in said plurality of slide films; and means for selectively deactivating said random access operating means in response to detachment of said attachment unit from said film projection apparatus to switch the random access projection mode to a normal sequential projection mode;

whereby random access projection and normal sequential projection are selectively performed as said attachment unit is selectively attached to and detached from said film projection apparatus.

11. A film projection system according to claim 10 wherein said signal input entry means has a plurality of switch means for developing the address signals.

12. A film projection system according to claim 11 wherein said signal holding means comprises a plurality of bistable circuits each connected to be operated by different ones of said switch means.

13. A film projection system according to claim 12 wherein said releasing means comprises a pair of transistor circuits connected to change the state of said bistable circuits, and a mechanical switch member electrically connected to said transistor circuits.

14. A film projection system according to claim 10 wherein said address detecting means includes a coded reference means mounted to move with said slide film storage means and means for reading information from said coded reference means.

15. A film projection system according to claim 14 wherein said information reading means comprises photoelectric converting means and light source which are symmetrically positioned adjacent said coded reference means.

16. A film projection system according to claim 10 wherein said film projection apparatus includes means for selectively switching said slide film storage means to step up and step back said drive means.

17. A film projection system capable of random access projection comprising:
a film projection apparatus including slide film storage means for storing a plurality of slide films;
actuating means for actuating said film projection apparatus, said actuating means comprising drive means for intermittently moving said slide film storage means along a predetermined path by a distance corresponding to one frame of the slide film, and transport means for transporting the slide film in said slide film storage means to a slide film projectable position where a selected slide film can be set for projection;
an attachment unit attachable to and detachable from said projection apparatus, said attachment unit including random access operating means for controlling said drive means to selectively dispose a desired one of said plurality of slide films at said slide film projectable position;
first housing means for housing said film projection apparatus and said actuating means, said first housing means having first coupling means operative to attach and detach, selectively, said film projection apparatus to and from said attachment unit, said first coupling means of said first housing means housing at least one part of said actuating means; and
second housing means for housing said attachment unit, said second housing means having second coupling means adapted to attach and detach, selectively, said attachment unit to and from said film projection apparatus, said second coupling means of said second housing means housing at least one part of said random access operating means;
whereby when said film projection means and said attachment unit are coupled each other, said drive means and said random access operating means are mechanically linked, and rendered capable of performing random access projection.

18. A film projection system according to claim 17 wherein said attachment unit includes projection mode switching means for selectively switching said system between the random access projection mode and a normal sequential projection mode.

19. A film projection system according to claim 17 wherein said attachment unit includes signal input entry means for entering a desired projection address signal for the random access, and signal holding means for holding an entered projection address signal for a predetermined time.

20. A film projection system according to claim 19 wherein said attachment unit includes means for releasing said signal holding means from holding operation of the entered projection address signal.

21. A film projection system according to claim 17 wherein said attachment unit includes address detecting means for detecting the address of each slide film when the film locates at a position where projection can be performed.

22. A film projection system according to claim 21 wherein said address detecting means comprises photoelectric signal converting means including a coded reference means connected to said drive means so that said reference means will be operated in response to actuation of said drive means to regulate light passage.

23. A film projection system according to claim 1 wherein said film projection apparatus includes means for selectively switching said slide film storage means to step up and step back by said drive means.

24. A film projection system according to claim 23 wherein said drive means includes a reversible motor.

25. A film projection system capable of random access projection comprising:
a film projection apparatus including slide film storage means for storing a plurality of slide films, and drive means for moving said slide film storage means along predetermined path and for transporting the slide films in said slide film storage means to a slide film projectable position where a selected slide film can be set for projection;
an attachment unit attachable to and detachable from said projection apparatus, said attachment unit including random access operating means for controlling to project a desired one of said plurality of slide films, said random access operating means being located at a position in said attachment unit where at least one part of said operating means becomes mechanically linked with said drive means for controlling operation of said drive means when said attachment unit is attached to said film projection apparatus, said random access operating means comprising signal input entry means for entering a desired projection address signal for the random access, said signal input entry means having a plurality of switch means each of which generates said address signal, signal holding means for holding the projection address signal for a predetermined time, said signal holding means comprising a plurality of two-element bistable circuits each arranged to be operated to change state in response to operation of one of said switch means, address detecting means for detecting the address of each slide film when the film locates at a position where the projection can be performed, and means for comparing the output signal of said address detecting means with the output signal of said signal input entry means to control said drive means in accordance with the output thereof,
whereby the random access projection and the normal sequential projection are selectively performed as said attachment unit is selectively attached and detached from said film projection apparatus.

26. In a film projection system capable of random access projection, a film projection apparatus including first housing means having first coupling means adapted to attach and detach selectively said film projection apparatus to and from an attachment unit, means for storing a plurality of slide films, and drive means for moving said slide film storage means along a predetermined path and for transporting the slide film in said slide film storage means to a slide film projectable position where a selected slide film may be set for projection, said drive means including means adapted to accept a driving control force at the exterior of said film projection apparatus, at least one part of the driving control force accepting means being disposed in said first coupling means and being mechanically linked with said slide film storage means, said drive means further including reversing means adapted to change a functional direction of the driving force for moving said slide film storage means, said reversing means being mechanically linked with said driving control force accepting means; and the attachment unit attachable to and detachable from said projection apparatus including second housing means having second coupling means adapted to selectively attach or detach said attachment unit to and from said film projection apparatus and random access operating means for controlling said drive means to project a desired one of said plurality of slide films by use of said film projection apparatus, said random access operating means comprising signal input entry means for entering a desired projection address signal for the random access, and means for operating in response to the projection address signal from said signal input entry means, said operating means including means adapted to link with said driving control force accepting means for applying driving control force to said driving control force accepting means, and control means adapted to link with said changeable means for controlling said reversing means, said control means having a control member electromagnetically operated by said projection address signal, at least one part of said control member being disposed within said second coupling means;

whereby random access projection can be performed when said first coupling means of the film projection apparatus and said second coupling means of the attachment unit are coupled each other, and when said driving control force accepting means and said driving control force applying means, and said reversing means and said control member are mechanically linked, respectively.

* * * * *

UNITED STATES PATENT OFFICE
CERTIFICATE OF CORRECTION

Patent No. 3,924,942            Dated December 9, 1975

Inventor(s) Tateo Yamada and Masanori Uchidoi

It is certified that error appears in the above-identified patent and that said Letters Patent are hereby corrected as shown below:

Column 3, line 27, change "by a" to --and--.

Column 6, line 9, after the word "gear" insert --30--.

Column 6, line 56, change the comma "," (first occurrence) to a period --.--.

Column 6, line 60, change "and" (third occurrence) to --are--.

Column 7, line 60, change "Tr 1-1" to --Tr1-i--.

Column 7, line 68, change "Tr1-1" to --Tr1-i--.

Column 8, line 9, change "Tr1-1" to --Tr1-i--.

Column 8, line 9, change "Tr2-1" to --Tr2-i--.

Signed and Sealed this twenty-fifth Day of May 1976

[SEAL]

Attest:

RUTH C. MASON
*Attesting Officer*

C. MARSHALL DANN
*Commissioner of Patents and Trademarks*